United States Patent
Böhm et al.

(10) Patent No.: US 7,176,979 B2
(45) Date of Patent: Feb. 13, 2007

(54) SYNCHRONIZATION PULSE DETECTION CIRCUIT

(75) Inventors: Christian Willibald Böhm, Limerick (IE); Michael Patrick Daly, Wicklow (IE); Kieran Heffernan, Limerick (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/905,786

(22) Filed: Jul. 13, 2001

(65) Prior Publication Data

US 2003/0076444 A1    Apr. 24, 2003

(51) Int. Cl.
*H04N 5/10* (2006.01)
(52) U.S. Cl. .................... 348/531; 348/530; 348/521
(58) Field of Classification Search ............... 348/531, 348/530, 521, 546, 516; 327/24, 27, 74, 327/75
See application file for complete search history.

(56) References Cited

U.S. PATENT DOCUMENTS 3,527,887 A * 9/1970 Clapp et al. ............... 327/24
4,520,393 A * 5/1985 Zwijsen et al. ............. 348/530
4,698,679 A * 10/1987 Balaban et al. ............. 348/532
4,722,004 A * 1/1988 Miyamoto et al. .......... 348/529
4,792,852 A * 12/1988 Narusawa .................. 348/530
4,829,377 A * 5/1989 Becker et al. .............. 348/530
5,003,564 A   3/1991 Fling ........................ 377/45
5,053,869 A * 10/1991 Pletz-Kirsch .............. 348/531
5,432,559 A * 7/1995 Bruins et al. ............... 348/530
5,539,343 A * 7/1996 Yamashita et al. .......... 348/531
5,844,622 A * 12/1998 Hulvey ...................... 348/546
6,130,719 A * 10/2000 Hebbalalu et al. .......... 348/529

* cited by examiner

Primary Examiner—Trang Tran
(74) Attorney, Agent, or Firm—Gauthier & Connors LLP

(57) ABSTRACT

A synchronization pulse detector includes an absolute value independent shape detector for processing samples of an input signal having a synchronization pulse and a plurality of non-synchronization pulses to determine whether such samples have a predetermined sequence. The predetermined sequence includes a first and second absolute value independent time-varying portions and a first and second absolute value independent non-time varying portions. One of the first and second absolute value independent time-varying portions having a positive slope and the other one of the first and second absolute value independent time-varying portions having a negative slope.

9 Claims, 13 Drawing Sheets

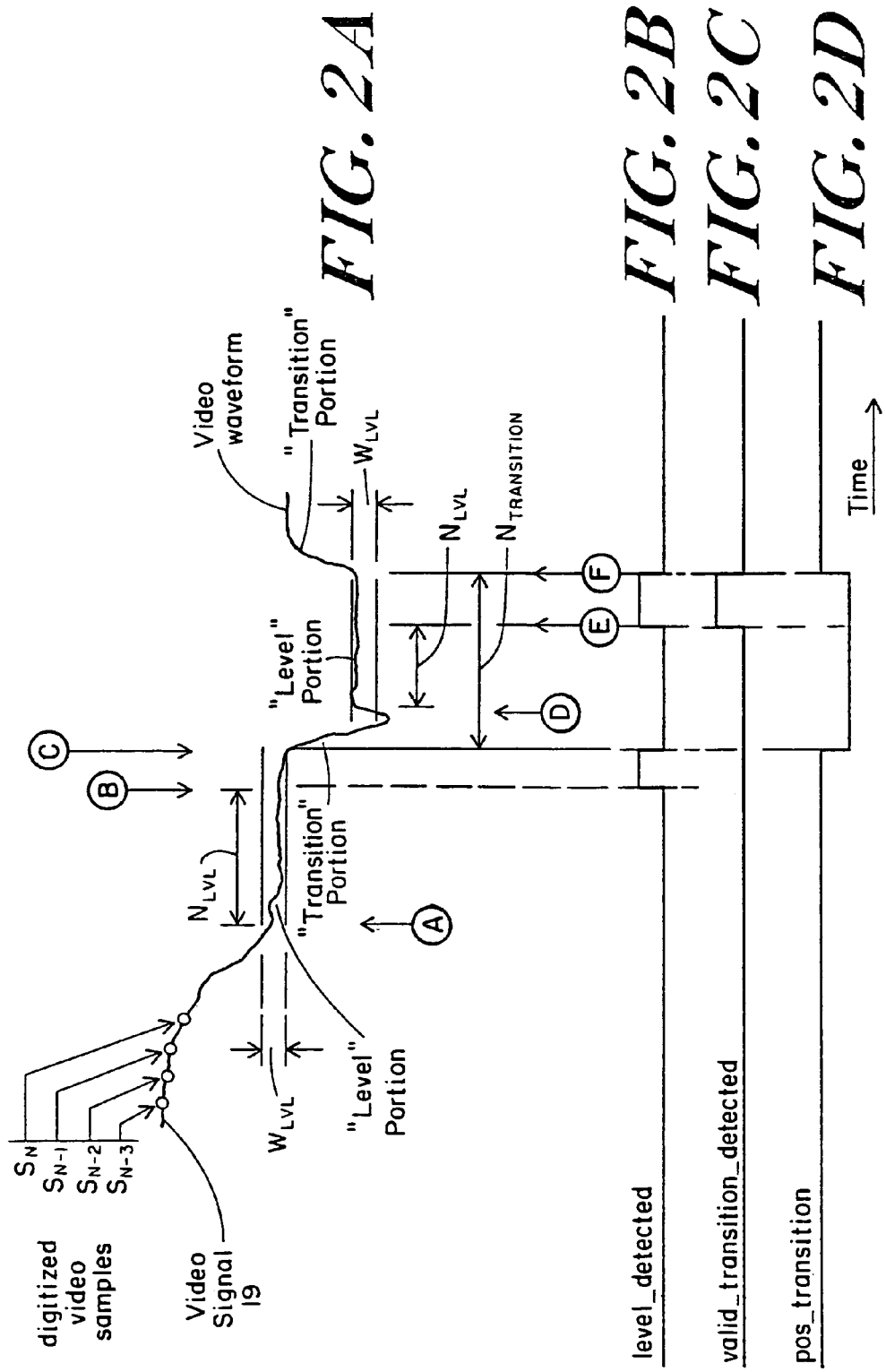

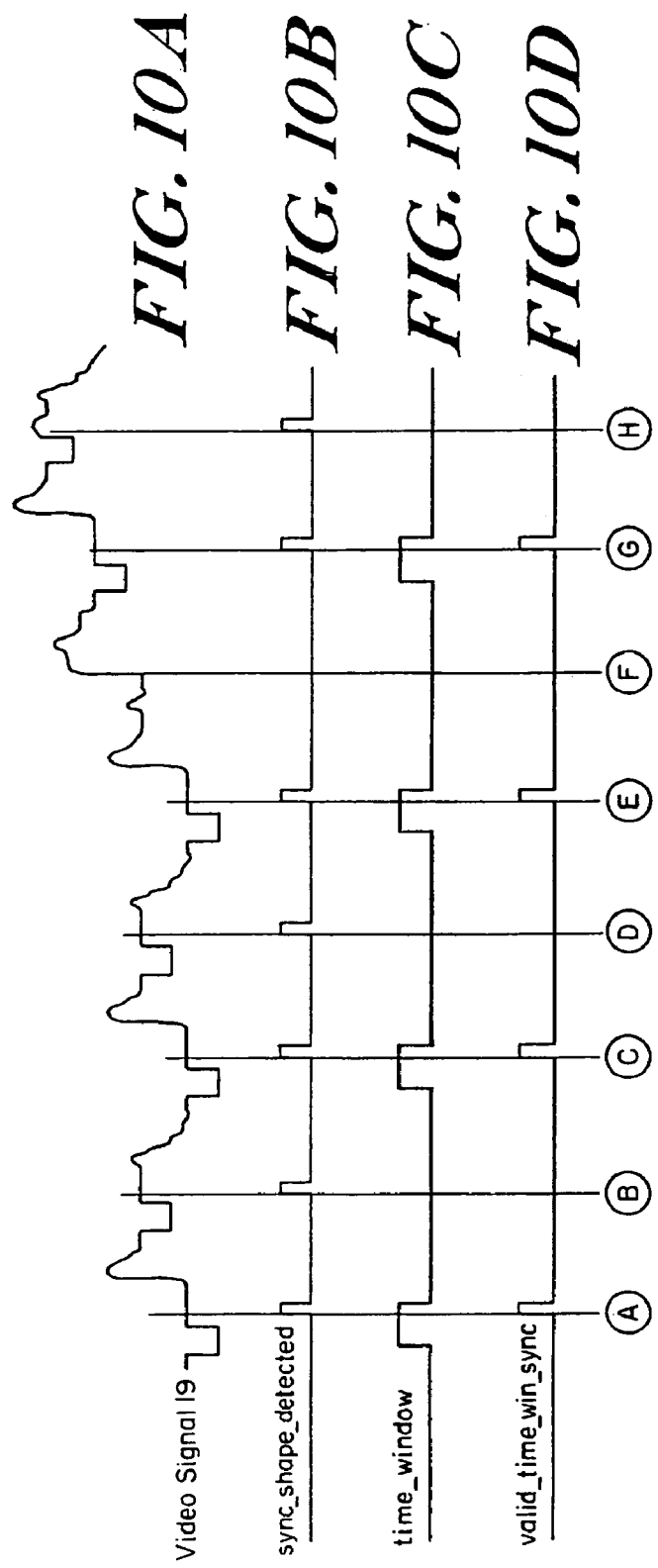

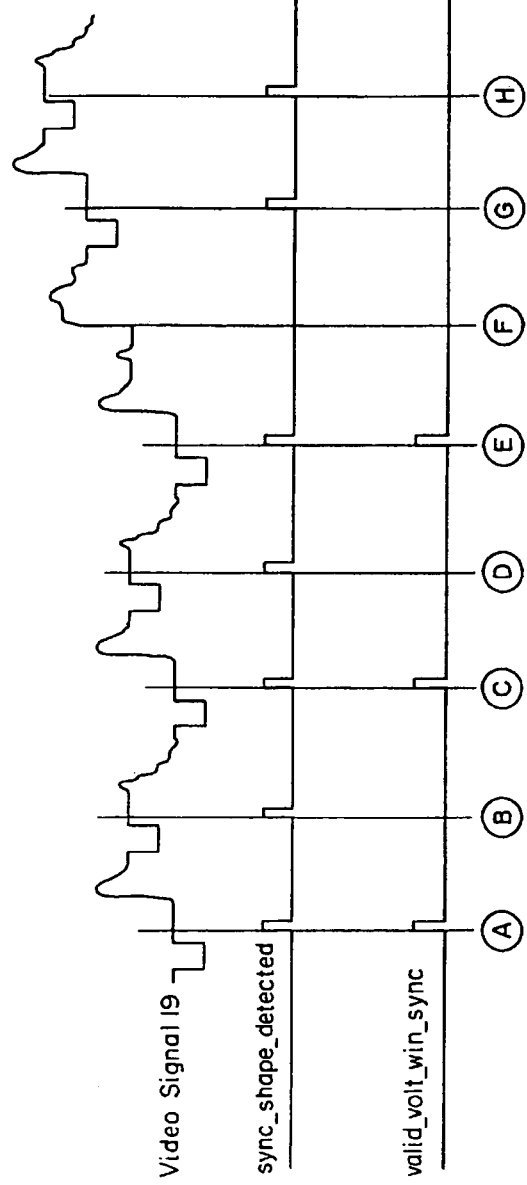

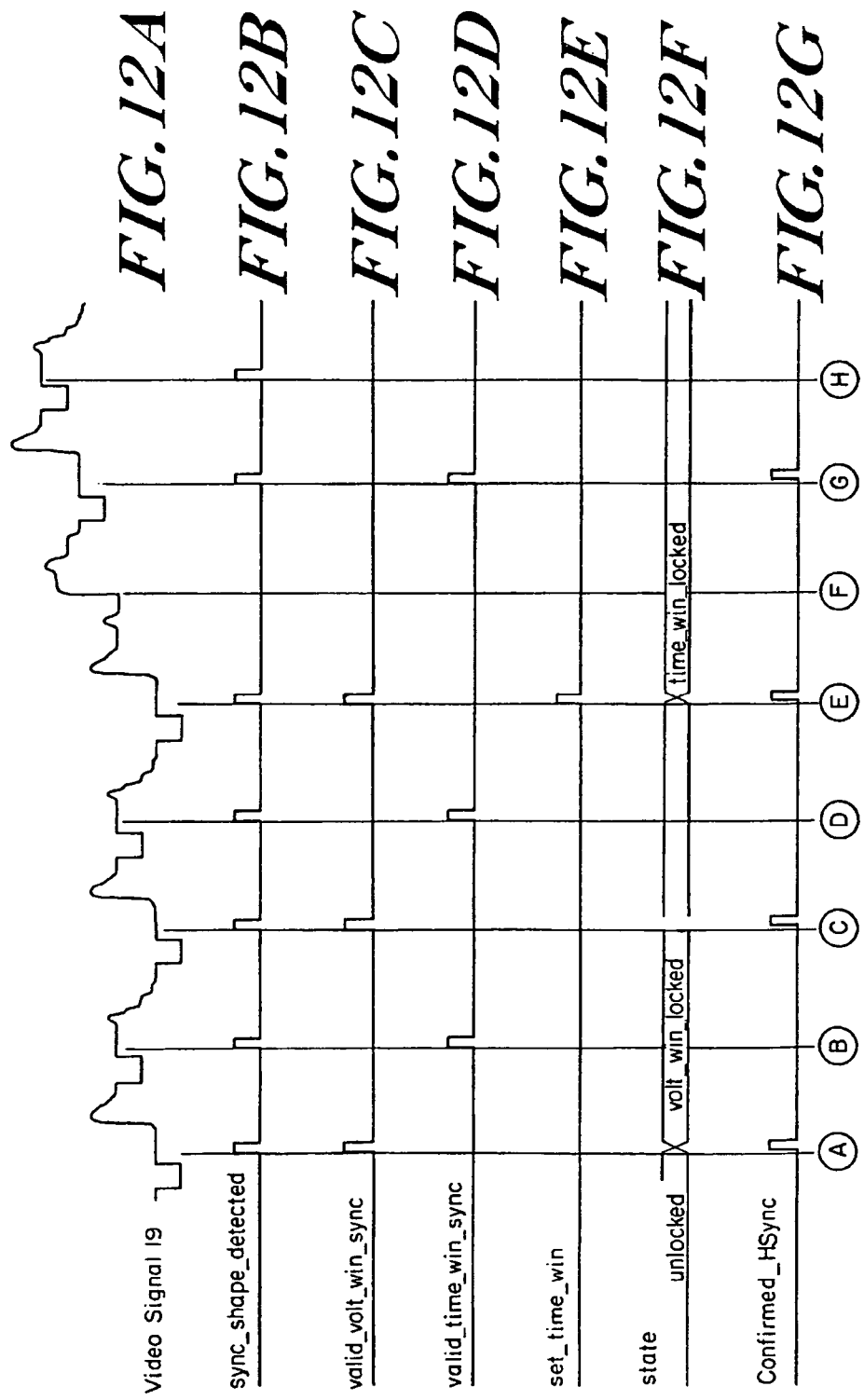

SYNCHRONIZATION PULSE DETECTION CIRCUIT

BACKGROUND OF THE INVENTION

The invention generally relates generally to synchronization pulse detection and more particularly to detection of synchronization pulses used in video signals.

As is known in the art, it is frequently required to provide a synchronization pulse prior to the active video information portion of a signal. For example, with video signal such as that shown in FIG. 1, each time a line, or segment, of video information 25 is provided, such line, or segment, is preceded with a horizontal synchronization pulse (i.e., Hsync). Thus, as shown in FIGS. 1 and 1A, each Hsync has a substantially non-time varying tip portion disposed between a pair of substantially time varying transition portions. The Hsync is preceded by a "front porch" and is terminated by a "back porch". The "color burst" signal resides within the "back porch". The "front porch" and "back porch" porch signals are at the "blanking level". The active video information 25 is provided between the termination of the "back porch" and the "front porch" of the next Hsync.

Horizontal synchronization pulses (Hsyncs) in video signals are used to identify the begin of a line, on segment, of video information 25. Hence, the accurate detection of the Hsync is crucial to the correct processing of the contents of a horizontal line, or segment, of video information 25. This is true for analogue video as well as its digitized equivalent. In some Hsync detection systems, the 50% point of their falling edge is used as a reference point for the timing of the rest of the line, or segment, of video. In order to detect an Hsync, many detection circuits rely on the fact that the Hsync extends substantially below the "blanking level" for a considerable length of time. In some of these systems, Hsync detection has been carried out by comparing the actual video signal amplitude with a threshold amplitude set below the amplitude of the "blanking level". Various filtering algorithms have been developed to avoid false triggering, for instance triggering on short glitches in the video signal. The threshold amplitude in the simplest implementation is of a DC nature. More advanced developments make the threshold amplitude adaptive to the incoming video signal.

The underlying assumption for all these algorithms is that the "blanking level" is known by the time Hsync detection takes place. This may not necessarily be the case since the transmission of a video signal usually trends to distort, or even lose, the DC value of a video signal. Many pieces of video equipment also rely on AC-coupling to connect video sources to them. As a result, the "blanking level" of the video signal is unknown. In practice, video signal clamp circuits are used to restore the DC value (See, for example U.S. Pat. No. 5,003,564). Only after the clamping process is finished, and the clamping control loop has settled, can one safely assume any DC value (e.g., "blank level", Hsync tip value, etc.) of the video signal to have been restored and therefore be known. Thereafter, the threshold value for Hsync detection can be determined by offsetting from the "blanking level".

While these techniques may be adequate for standard video signals from good quality signal sources under conditions where a fast lock-in time is not of high importance, they are very sensitive to DC shifts within the video signal. Furthermore, the initial lock-in depends on a successful clamp (i.e., successful restoration of the DC value). There also is a time penalty with this technique since the clamping and Hsync detection now become sequential tasks. Improved versions of Hsync detection use adaptive thresholds (See, for example, U.S. Pat. No. 5,576,770) which produce an adaptively restored DC value. While this provides a more robust function of the detection circuit during lock, it still relies on the performance of the clamping circuit (i.e., DC restoration) for initial lock and uses a principle known as "sync slicing", i.e., the comparison of a signal amplitude with the adaptively restored pseudo DC value.

SUMMARY OF THE INVENTION

In accordance with the present invention, a synchronization pulse detection circuit is provided which determines time varying properties an input signal having the synchronization pulse and, from such determined time varying properties detects when such time varying properties have a shape of a synchronization pulse.

Such synchronization pulse detection is independent of any DC value of the signal. Detection of the synchronization pulse is based on detecting a shape in the signal rather than relying on a comparison of the signal with a DC value. To put it another way, the detection process scans the signal for a known shape (i.e., signature characteristic) of the signal rather than for a DC, or pseudo DC, value crossing.

In accordance with one embodiment of the invention, a synchronization pulse detector is provided for detecting a synchronization pulse within an input signal. The input signal has "level" portions (i.e., substantially non-time varying portions) and "transition" portions (i.e., substantially time varying portions). The pulse detector includes a pulse shape detector for determining each time the input signal has a proper sequence of a first "level" portion, followed by a first "transition" portion, followed by a second "level" portion, followed by a second "transition" portion followed by a third "level" portion, one of the first and second "transition" portions being positive and the other one of the first and second "transition" portions being negative. Each time such sequence is determined, a pulse_shape detected pulse is produced.

In accordance with another feature of the invention, an evaluator is provided to reject invalid pulse_shape detected pulses. The evaluator includes a time window for determining whether such shape_detected pulses are produced at a predetermined rate expected for a series of the synchronization pulses. The evaluator includes a voltage window responsive to the produced shape_detected pulses and their associated values of the second "level" portions for determining whether the average value of one of such produced second "level" portions is substantially lower or the same, but not higher than the lowest DC value detected within the time-equivalent of the last line, or segment, of video. The evaluator may include both the time window and the voltage window. The voltage window is mainly used to acquire an initial lock to an unknown and not yet clamped video signal.

BRIEF DESCRIPTION OF THE DRAWING

These and other features of the invention will become more readily apparent from the following detailed description when taken together with the accompanying drawings, in which:

FIGS. 2A through 2D are timing diagrams useful in understanding the operation of the HSync detector of FIG. 2;

FIGS. 10A through 10D are timing diagrams useful in understanding the operation of the HSync detector of FIG. 2;

FIGS. 11A through 11C are timing diagrams useful in understanding the operation of the HSync detector of FIG. 2; and FIGS. 12A through 12G are timing diagrams useful in understanding the operation of the HSync detector of FIG. 2.

DESCRIPTION OF THE PREFERRED EMBODIMENTS

Figure 1:
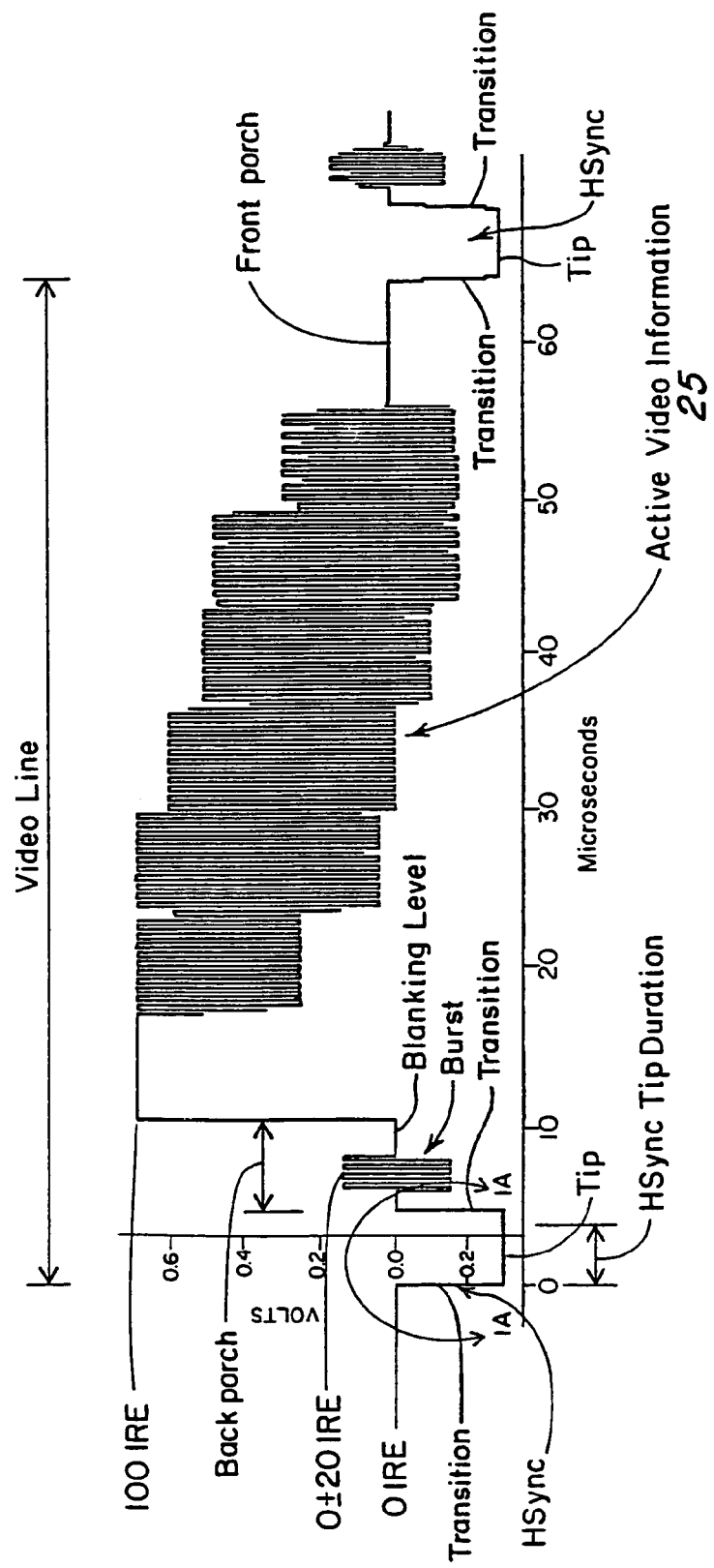
FIG. 1 is a time history of video signals prior to removal of "color burst" according to the PRIOR ART.
Figure 1A:
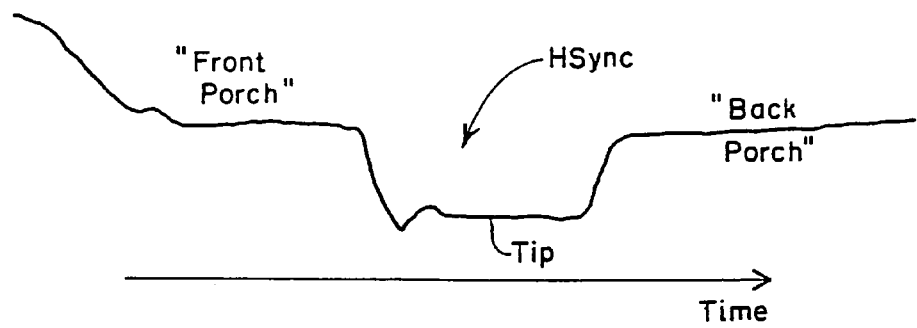
FIG. 1A is an exploded portion of the video signal of FIG. 1, such exploded portion being encircled by line 1A—1A in FIG. 1.
Figure 2:
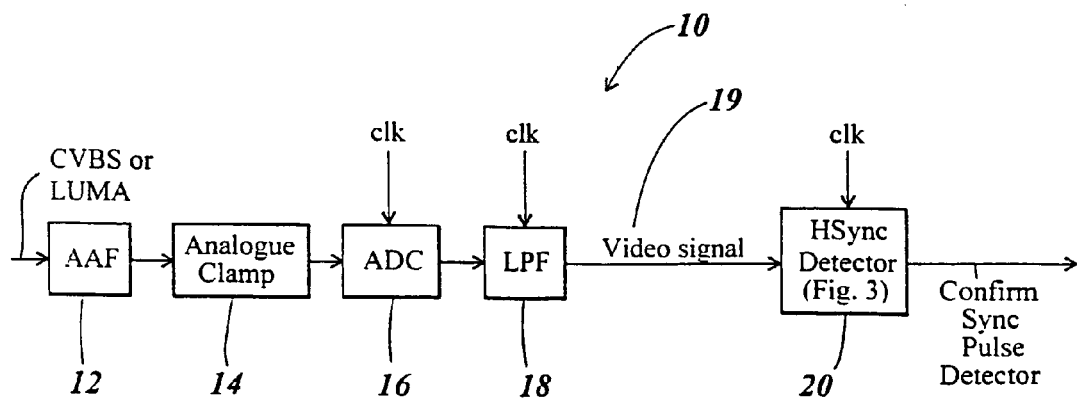
FIG. 2 is a block diagram of a video processor having a horizontal synchronization pulse (HSync) detector according to the invention.

Referring now to FIG. 2, a video signal processor 10, either of composite type (meaning that color information is included, i.e., a color video burst signal, CVBS) or of luminance and sync information only (like the Y component of a YC, i.e., black and white, video signal), is shown. A video signal, such as that described above in connection with FIG. 1, is fed through an analogue anti-alias filter (AAF) 12 prior to being clamped by an analogue clamp 14). Clamping is needed to bring the input signal into the input window range of an analogue-to-digital converter (ADC) 16 which converts the complete video signal into a digital number stream representing the instantaneous values of the input signal, here the video signal shown in FIG. 1. A low-pass-filter (LPF) 18 is optional and only needed in the case of CVBS input signals. It has a cut-off frequency below the frequency of the color-subcarrier and hence removes the color burst from the "back porch" of the video signal. This filtering operation is not needed for luminance and sync only signals (i.e., black and white signals) since no color information and hence no color burst is present. The output from the low pass filter 18 forms the video signal 19 (i.e., the video signal shown in FIG. 1 with the color burst removed by the LPF 18 which is fed as the primary input into the Hsync detector 20. The HSync detector 20 will be described in more detail in connection with FIG. 3. It is noted that clock pulses, clk, are fed to the ADC 18 and serve as sampling pulses of the signal fed thereto. It is also noted that the clock pulses are fed to the LPF, a digital low pass filter, and to the synchronization pulse (Hsync) detector 20.

Referring now also to FIG. 2A, it is noted that the video signal 19 includes "level" portions and "transition" portions. The "level" portion of the signal has a substantially non-time varying amplitude value while the "transition" portion has a substantially time varying amplitude value, as shown in FIG. 2A. In other words: A "level" portion does not form a consistent slope and hence a differentiation of the signal values would lead to a zero; while, on the other hand, "transition" portions are simply the opposite of levels. i.e., their time differential leads to a non-zero result. In order to detect a Hsync, the Hsync detector 20 (FIG. 2) splits the video signal fed thereto into different segments, or portions, i.e., the "level" portions and the "transition" portions. Based on this separation, the Hsync detector 20 is able to identify the rectangular shape of the Hsync by scanning for a sequence of "levels" and positive or negative "transitions". More particularly, it is also noted that an HSync has a known sequence (i.e., shape) of a first "level" portion (i.e., the front porch), followed by a first "transition" portion (here, a negative "transition" portion), followed by a second "level" portion (i.e., the tip), followed by a second "transition" portion (here, a positive "transition" portion), followed by a third "level" portion (i.e., the "back porch").

The synchronization pulse detector 20 includes a shape detector 22 for detecting HSync shapes and an evaluator 24 for rejecting detected HSync shapes which are invalid because they do not have properties expected of a valid HSync (e.g., time rate of occurrence and tip value) More particularly, the evaluator 24 rejects detected HSync shapes which may occur during the active video information portion 25, FIG. 1. Still more particularly, the pulse shape detector 22 determines each time the input signal has a proper sequence of a first "level" portion, followed by a first "transition" portion, followed by a second "level" portion, followed by a second "transition" portion followed by a third "level" portion, one of the first and second "transition" portions being positive and the other one of the first and second "transition" portions being negative. Each time such proper sequence is determined, a pulse_shape detected pulse is produced. The evaluator 24 rejects invalid pulse_shape detected pulses. More particularly, the evaluator 24 includes: A time window 34 for determining whether such shape_detected pulses are produced at a predetermined rate expected for the series of synchronization pulses; and, A voltage window 36 responsive to the produced shape_detected pulses and their associated values of the second "level" portions (i.e., the presumed tips) for determining whether the average value of one of such produced second "level" portion is substantially lower, or the same as, but higher than the lowest DC value detected within the time-equivalent of the last line, or segment, of video. The voltage window 36 is mainly used to acquire an initial lock to an unknown and not yet clamped video signal.

Referring again to FIGS. 2A and 2B, it is noted that a "level" portion begins to occur at time "A". From FIG. 2B, it is noted that a level_detected signal (i.e., a "low" to "high" transition in the level_detected signal) is produced by the "level" portion detector 22 at time "B". The level_detected signal terminates at time "C"; thereby indicating the commencement of a "transition" portion. It should be noted that the "transition" portion terminates at time "D", with a new "level" portion being detected by the "level" portion detector 26 at time E. Further, the new "level" portion terminates at time F. Finally, it is noted that the average value of the first "level" portion (i.e., between times A and C) is greater than the average value of the second (i.e., the new) "level portion (i.e., between times D and F), therefore the "transition" portion between the first and second "level" portions (i.e., the "transition" portion between times B and C) is a negative transition, as distinguished from the position "transition" portion after time F.

Figure 3:
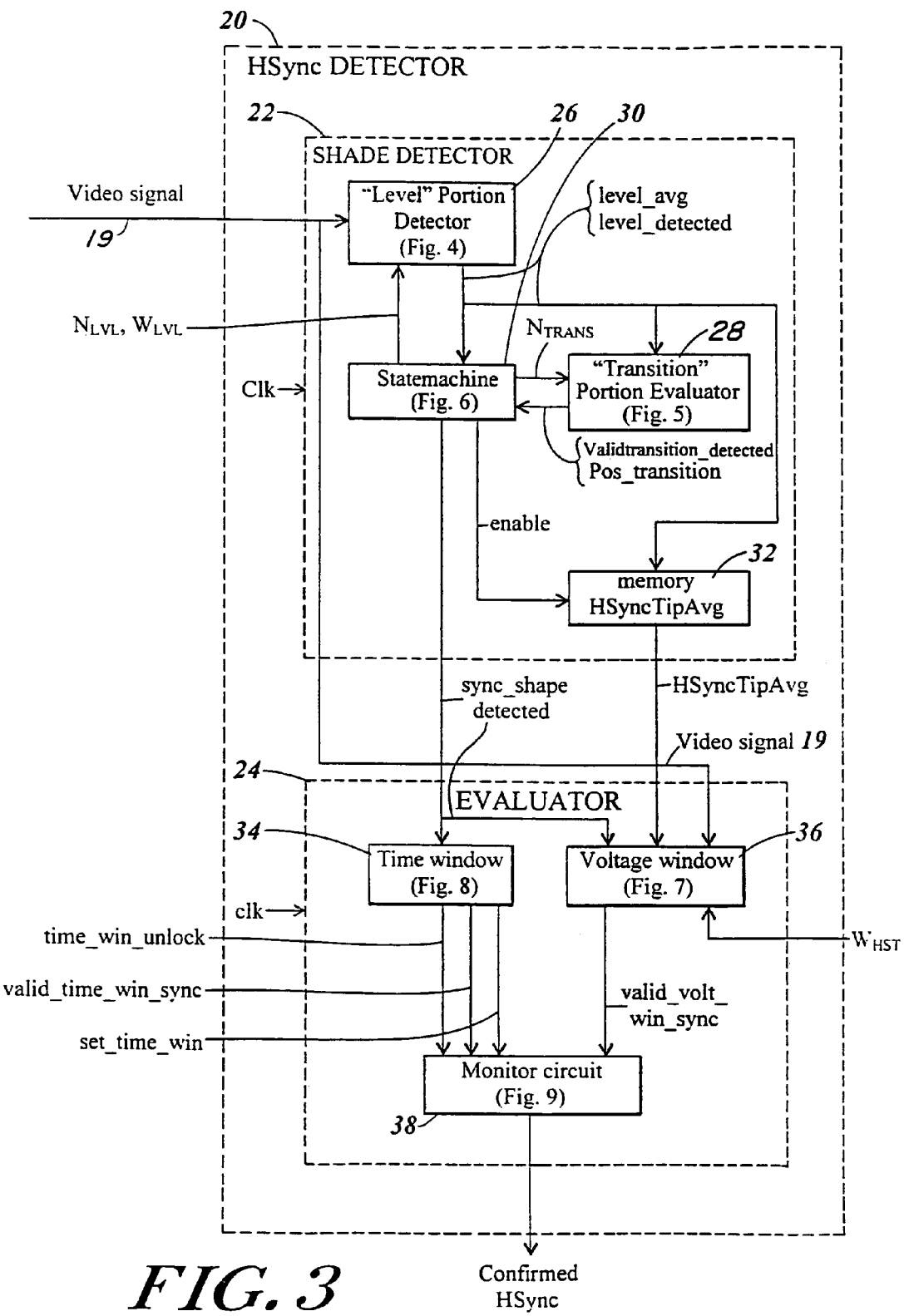
FIG. 3 is a block diagram of the HSync detector of FIG. 2.

Referring now to FIG. 3, the Hsync detector 20 includes the shape detector 22 and the evaluator 24. The HSync detector 20 is fed by the video signal 19 produced at the output of LPF 18 (FIG. 2). In order to perform a shape detection, the Hsync detector 20 uses the shape detector 22 to detect "level" portions and the Hsync detector 20 merely defines "transition" portions as the signal between "level" portions. In an opposite approach, it is also possible to detect "transition" portions (for instance, by differentiating the video signal 19) and then declaring signals at times between clearly definable transitions as "level" portions.

More particularly, the shape detector 22 includes: the "level" portion detector 26, to be described in more detail in connection with FIG. 4; a "transition" portion evaluator 28, to be described in more detail in connection. with FIG. 5; a statemachine 30, adapted to execute a program to be described in more detail in connection with FIG. 6 to determine each time there is a proper sequence of a first "level" portion (i.e., the front porch), followed by a first "transition" portion (here, a negative "transition" portion), followed by a second "level" portion (i.e., the tip), followed by a second "transition" portion (here, a positive "transition" portion), followed by a third "level" portion (i.e., the "back porch"). The "level" portion detector 26 also includes a memory 32 for storing the average value of the tip portion of the detected HSync shape. The evaluator 24 rejects detected HSync shapes which may be produced during active video information 25 (FIG. 1) and includes: the time window 34, described briefly above to determine whether the detected HSync shapes have a repetition rate consistent with the rate expected for HSyncs and to be described in more detail in connection with FIG. 8; the voltage window 36, described briefly above to determine whether the value of the tip of the detected HSync shape has a proper value consistent with the value of the tip of the last valid detected HSync shape and to be described in more detail in connection with FIG. 7; and a monitor circuit 38, for producing a confirmation HSync pulse when the detected HSync shape has either or both proper repetition rate, as determined by the time window, and proper tip value, as determined by the voltage window to be described, such monitor circuit 38 to be described in more detail in connection with FIG. 9.

Briefly, the shape detector 22 continuously examines an incoming data stream, i.e., the video signal 19 and flags any signature characteristic (i.e., shape) within the signal which are similar to the a priori known signature characteristic (i.e., shape, or the proper sequence described above) of a horizontal synchronization pulse (i.e., a Hsync). More particularly, the shape detector 22 produces a sync_shape detected signal when an HSync shape is detected (i.e., the video signal has the proper sequence described above) and also produces an HSyncTipAvg signal indicating the average level of the tip (i.e., second detected "level" portion) of detected HSync. It should be understood that a proper HSync shape may be detected incorrectly, for example detected during the time of active video information 25 (FIG. 1). That is, a proper sequence indicative of an HSync shape may be detected during the active video 25 (FIG. 1). The evaluator 24 evaluates detected HSync shape and determines whether it is a proper (i.e., valid) HSync, i.e., the detected HSync shape does not occur during the active video information 25, FIG. 1. The evaluator 24 does this evaluation by: (1) determining, with the time window 34, whether these detected HSync shapes are occurring at a time repetition interval consistent with that of a video signal, i.e., 64 microseconds for PAL, as shown in FIG. 1; and (2) determining, with the voltage window 36, whether the average value of the detected HSync shape (i.e., the presumed HSync tip, FIG. 1), is within a window above or below the lowest DC value within a time duration equal to that of a video signal line, or segment.

To put it another way, the shape detector 22 includes a "level" portion detector 26, a "transition" portion evaluator 28 and statemachine 30 to detect any Hsync type shape within the incoming data stream. In order to detect a Hsync shape, or signature, the waveform is split up into different segments, or portions (FIG. 2A. As noted above, a Hsync basically consists of two types of shapes, namely "level" portions and "transition" portions. Based on this separation it is possible to identify the rectangular shape of the Hsync by scanning for a sequence of levels and positive or negative transitions. A "level" portion is characterized by a certain number of signal values which are within which the difference between the smallest and the largest single sample value does not exceed $W_{LVL}$. In other words: They do not form a consistent slope and hence a differentiation of the signal values would lead to a zero. A transition portion is simply the opposite of levels. Their differential leads to a non-zero result, they show either an up- or downwards slope. In order to perform a shape detection the disclosed circuitry employs a dedicated system to detect "level" portion (i.e., the "level" portion detector 26) and it defines "transition" portions merely as the signal between "level" portions. In an opposite approach it is also possible to detect "transition" portions (for instance by differentiating the video signal) and declare signals at times between clearly definable transitions as "level" portions. Another approach which can be used is to have the "level" portion detector 26 constantly monitor the incoming data stream and compare consecutive sample values with each other. It searches for sequences where a certain minimum number of samples $N_{LVL}$ all have values within a window height of $W_{LVL}$ (FIG. 2A).

Here, in this embodiment, the shape detector 22 includes the "level" portion detector 26 which produces a level_detected signal when a comparison between actual value variations over time in the video signal 19 and a predetermined value time variation over time criterion representative of one of the substantially non-time varying portion of the horizontal synchronization pulse indicates that a "level" portion has occurred. The "level" portion detector 26 also produces a level_avg signal representative of the average value of the detected "level" portion. The "transition" portion evaluator 28, produces, in response to the level_detected signal (FIG. 2B) and the level_avg signal, a valid_transition_detected signal (FIG. 2C) if the rate of change in the detected "transition" portion is less than a maximum change rate expected of a video signal "transition" portion. Further, the "transition" portion evaluator 28 determines from the level_avg signal whether the transition is a positive transition or a negative transition. If a valid HSync shape is determined to exist by the statemachine 30, the sync_shape_detected signal is fed to the evaluator 24 and the level_avg signal produced by the "level" portion detector is stored in memory 32 to thereby store data representative of HSyncTipAvg; i.e., the average value of the tip of the detected Hsync shape.

As noted above, the evaluator 24 separates correct Hsync shapes from Hsync-like shapes which may occur in active video information portion 25 (FIG. 1) of the video signal. Additional information is used by the evaluator 24 to qualify the shapes detected by the shape detector 22 which includes their time of occurrence (as detected by the time window 34) and their relative voltage offset with respect to the previous video line, or segment (as detected by the voltage window 36). More particularly, as described above, the evaluator 24 does this evaluation by: (1) determining, with the time window 34, whether these detected HSync shapes are occurring at a time repetition internal consistent with that of a video signal, i.e., 64 microsecond for PAL, as shown in FIG. 1; and (2) determining, with the voltage window 36, whether the average value of the detected HSync tip (i.e., the presumed HSync tip, FIG. 1), is within a window above or below the lowest DC value within the previous video signal line, or segment. The monitor circuit 38 examines the outputs from both the time window 34 and the voltage window 36 and combines them to the final output, i.e., confirm a valid detected HSync shape (i.e., one not occurring during the active video information 25, FIG. 1, for example). That is, the monitor circuit 38 (FIG. 3) constantly monitors the results from the voltage window 36 and the time window 34. Depending on the current state of the system (locked/unlocked, etc.), the monitor circuit 38 prioritizes the result of one of the windows 34, 36 over the other one of the windows 34, 36. The detected Hsync shapes are interpreted by the monitor circuit 38 and form the final result of the sync detection process.

Figure 4:
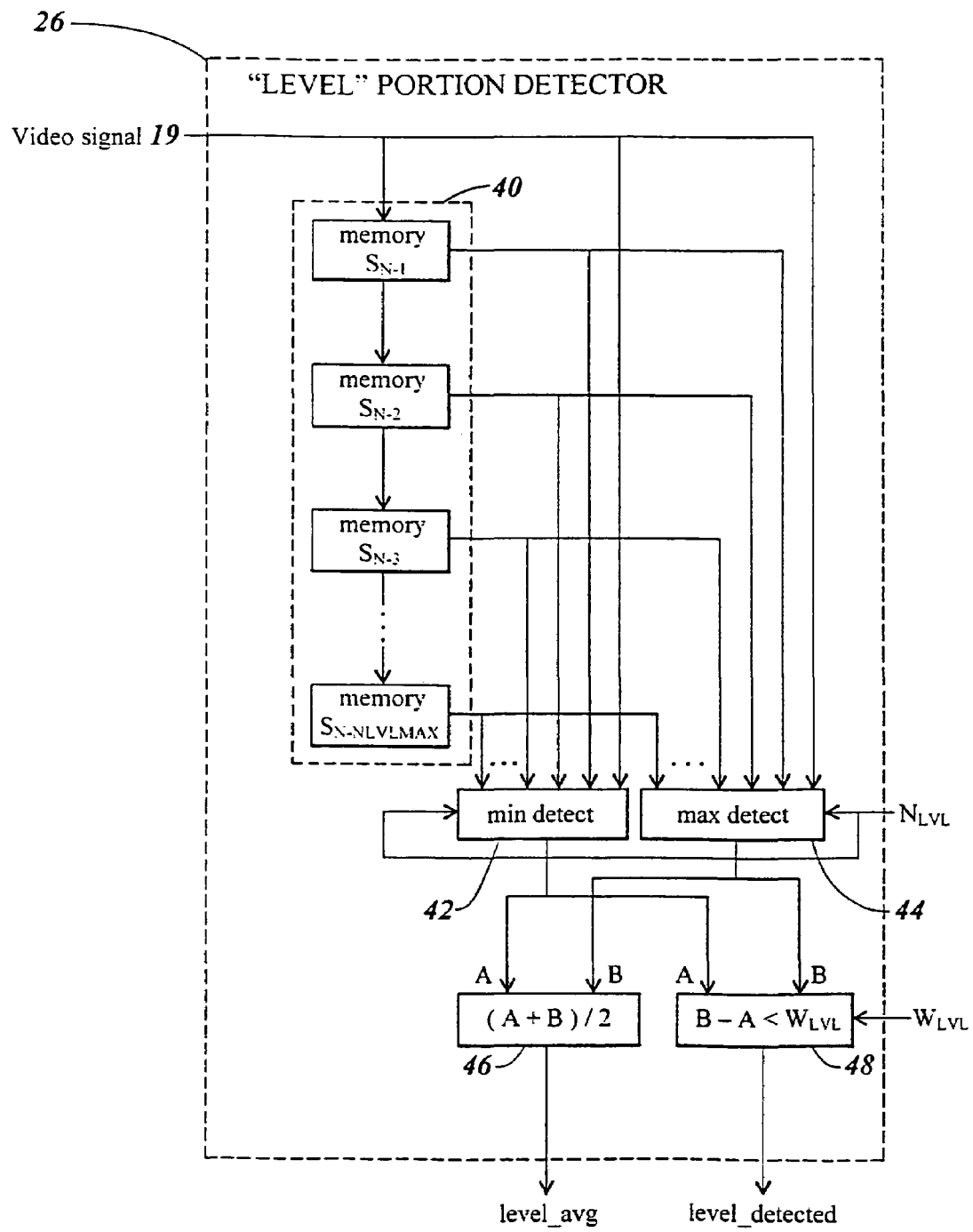
FIG. 4 is a block diagram of a "level" portion detector used in the HSync detector of FIG. 2.

Referring now to FIG. 4, the "level" portion detector 26 is shown to include a plurality of $N_{LVLMAX}$ memories $40_1$–$40_{LVLMAX}$ for storing a batch of the $N_{LVLMAX}$ most recent samples $S_{N-1}, \ldots S_{LVLMAX}$ of the video signal 19, FIG. 2A. The batch of the M+1 most recent samples $S_N$, $S_{N-1}$, ... $S_{LVLMAX}$ are fed to a minimum value detector 42 and a maximum value detector 44, as shown in FIG. 4. The $N_{LVLMAX}$ is the batch size and is typically 16 to 32. The minimum value detector 42 and the maximum value detector 44 are also fed with the number of samples to be used by the detectors 42, 44. For example, if the statemachine 30 is at the stage of examining the "level" portion for a "back porch" characteristic (as in Step 316 to be described in connection with FIG. 6), $N_{LVL}$ will be larger than when the statemachine 30 is at the stage of examining "level" portion for a "front porch" characteristic (as in Step 304) due to the different timing specifications for both porches. The detectors 42, 44 use the most recent $N_{LVL}$ ones of the $N_{LVLMAX}$ samples. If the difference between the maximum value ("B", in FIG. 4) of the current batch and the minimum value ("A" in FIG. 4) of such current batch is less than a predetermined value $W_{LVL}$ (FIG. 2A), the level_detected signal is produced a comparator 48. Further, the level_avg signal is produced by averager 46 in accordance with (A+B)/2, i.e., the one-half of the sum of maximum value of the samples in the batch are the minimum value of the samples in the batch. (It should be understood that the signal level_avg is the average of the maximum value of the samples in the batch and the minimum value of the samples in the batch. It is worth noting that the system would work just as well if the average over all samples in the batch was used instead).

Figure 5:
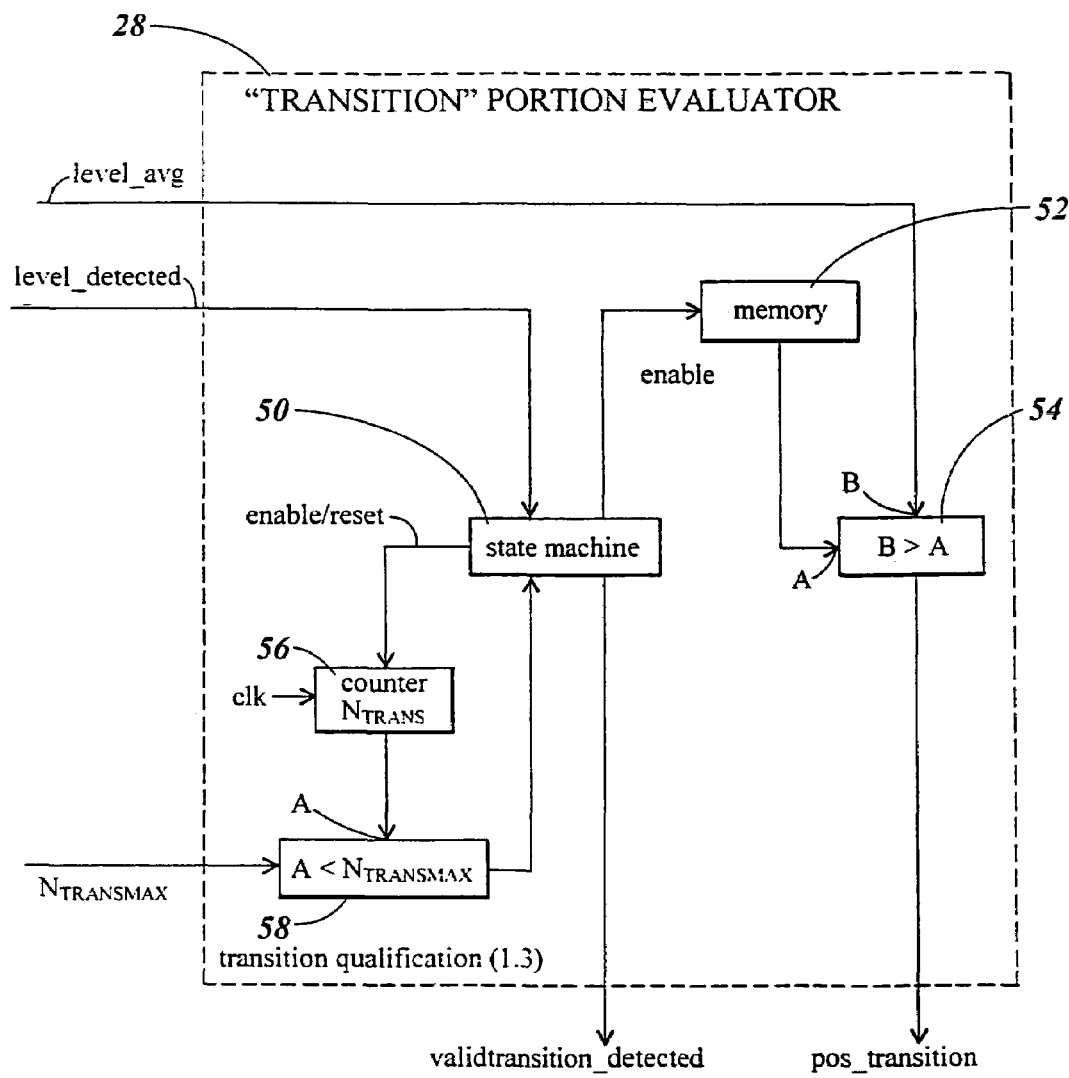
FIG. 5 is a block diagram of a "transition" portion evaluator used in the HSync detector of FIG. 2.

Referring now to FIG. 5, the "transition" portion evaluator 28 is shown to include a statemachine 50 fed by the level detected signal produced by the "level" portion detector 26 (FIG. 4) and a memory 52 fed by the level_avg signal produced by the "level" portion detector 26 (FIG. 4). The level_avg of the current batch is fed to the input B of comparator 54. Further, in response to the "level" portion detector 26 (FIG. 4) producing a level_detected signal (FIG. 2B), as described above in connection with FIG. 4, the statemachine enables the memory 52 to store the level_avg signal produced by the "level" portion detector 26. Thus, in response to the level_detected signal (FIG. 2B), the average value of the batch of most recent samples $S_1$–$S_{LVLMAX}$ is fed to input B of comparator 54 along with the average value of the last batch of samples of a detected "level" portion which are stored in memory 52. If the average value of the present batch of samples is greater than the average value of the last batch of samples, a positive transition is indicated and a pos_transition signal (FIG. 2D) is produced by the "transition" portion evaluator 28.

Referring also again to FIG. 5, it is noted that the "transition" portion evaluator 28 includes a counter 56. The counter 56 is initially in a reset condition. The statemachine, in response to the absence of the level_detected signal (FIG. 2B) (i.e., when the level_detected signal goes "low") enables counter 56 to count the number of samples. i.e., the clk pulses. The contents of the counter 56 after being enabled represents the number of samples since the commencement of a possible "transition" portion. The content of the counter 56 $N_{TRANS}$ is fed to a comparator 58. Also fed to the comparator 58 is a signal $N_{TRANSMAX}$ representative of the maximum number of samples which are expected in a valid HSync transition. If $N_{TRANS}$ is less than $N_{TRANSMAX}$ the statemachine 50 produces the valid_transition_detected signal (FIG. 2C).

The statemachine 30 monitors the level_detected signal from the "level" portion detector 26. At the end of a "level" portion, the statemachine 30 causes the memory 32 to store the average value of the last "level" portion as provided in the level_avg signal by the "level" portion detector 26. The statemachine 30 contains a program (the flowchart being shown in FIG. 6) to search for a fixed sequence of "transition" portions and "level" portions which assemble to a Hsync type shape.

More particularly, referring to FIG. 1, it is noted that a valid HSync shape (or signature characteristic) is when the video signal goes through the following sequence: a first "level portion" (corresponding to the front porch) followed by negative "transition" portion (corresponding to the transition from the front porch to the tip) followed by a second "level" portion (corresponding to the tip) followed by "positive" transition portion (corresponding to the transition from the tip to the "back porch") followed by third "level" portion (corresponding to the "back porch"). The statemachine 30 searches for this sequence of: first "level portion" followed by negative "transition" portion followed by second "level" portion followed by "positive" transition portion followed by third level" portion. Once such sequence is detected by the statemachine 30, the statemachine 30 produces a sync_shape_detected signal after detection of the third "level" portion detection (i.e., after the detection of the assumed "back porch"). Reference is made to FIG. 10A, which shows a typical sequence of proper video lines, or segment, which commence at times A, C, E, and G together with their associated color bursts, and additional signals at times B, D, and H which, while having proper HSync shapes, and which result in sync_shape_detected signals being produced as indicated in FIG. 10B are pseudo HSyncs and are rejected by the evaluator 24 (FIG. 3).

Figure 6:
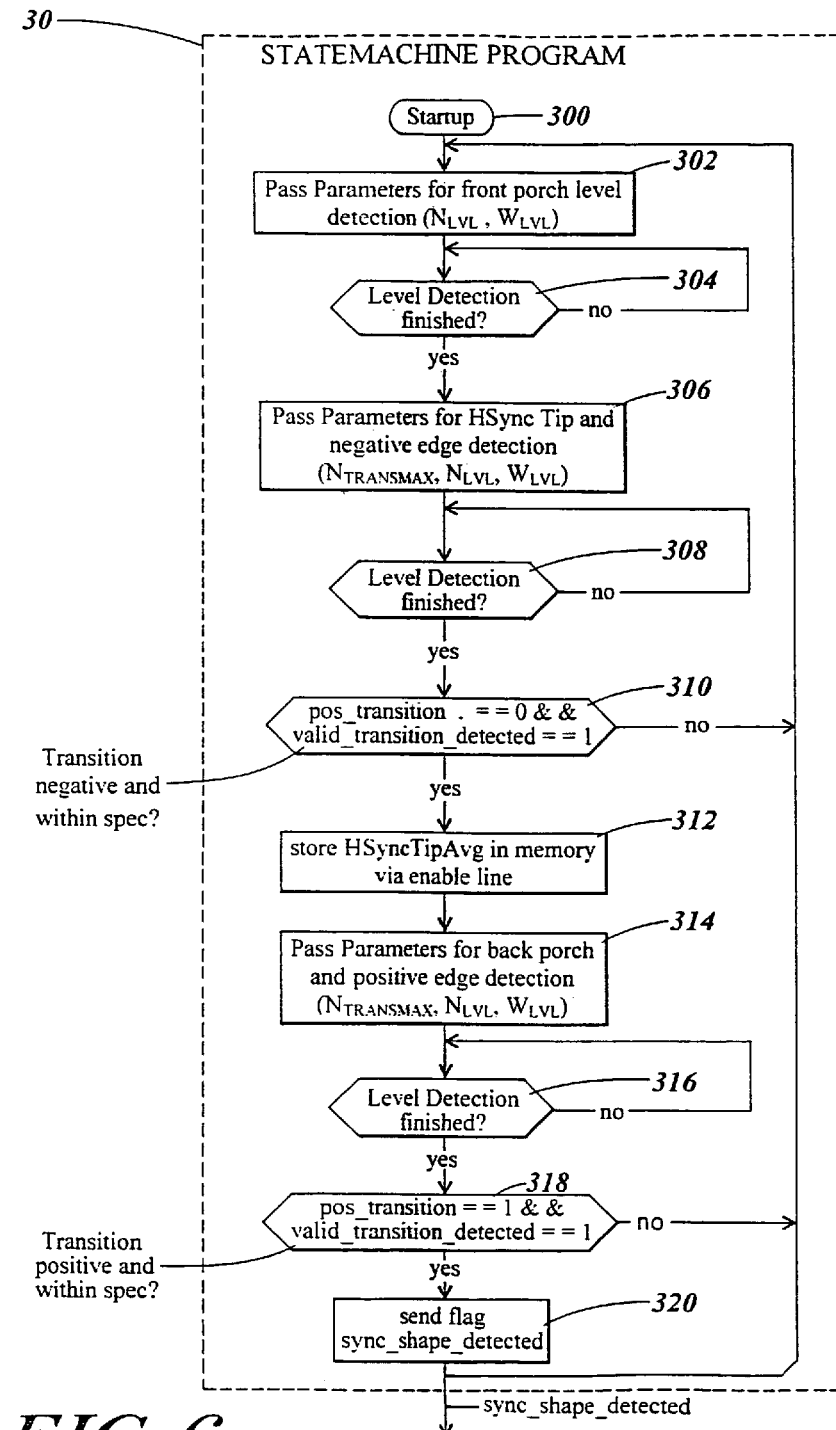
FIG. 6 is a flowchart used by a statemachine of the HSync detector of FIG. 2.

The flowchart in FIG. 6 gives an example of such a program different implementations of this program are possible. The statemachine 30 has two functions: it provides the "level" portion detector 26 and "transition" portion evaluator 28 with their respective parameter values $W_{LVL}$, $N_{LVL}$, $N_{Trans}$, $N_{Trans}$, and $N_{avg}$. It also checks for a predetermined sequence of "level" portions and "transition" portions to find Hsync type shapes (i.e., signature characteristics) in the video signal 19, as described above. Both, the parameters and the portions of the shape can be made adaptive to suit signals dependent on their quality and the robustness of the algorithm required. In any event, the statemachine 30 produces a sync_shape_detected signal when an HSync shape, or signature characteristic, has been detected as described above. Also, the average value of the last suspected sync tip is provided as the HSyncTipAvg signal by the memory 32.

Thus, referring to FIG. 6, start-up occurs at Step 300. Next, the parameters $N_{NVL}$ and $W_{LVL}$, which are expected for the front porch "level" portion (i.e., the first "level" portion in the sequence being examined by the statemachine 30), are passed to the minimum and maximum detectors 42, 44 and to the comparator 48. Next, Step 304 determines whether the "level" portion process has been competed. When completed, the process proceeds to Step 306 where the statemachine passes the parameters $N_{TRANSMAX}$, $N_{LVL}$, and $W_{LVL}$ associated with a valid front porch to tip "transition" portion and a HSync tip "level" portion to the minimum and maximum detectors 42, 44 and to the comparators 48 and 58. When "level" portion detection by detector 26 is completed (Step 308), the statemachine proceeds to Step 310. During Step 310, the statemachine 30 determines whether there has been a "not positive" (i.e., a negative transition) and whether the transition was valid (i.e., a valid_transition_detection signal (FIG. 2C) is produced). If so, the statemachine proceeds to Step 312 (i.e., the statemachine is now at the tip). The average value of the suspected HSync tip is stored in memory 32 for later reference by the voltage window 36 within the evaluator 24. The statemachine 30 passes parameters $N_{TRANSMAX}$, $N_{LVL}$ and $W_{LVL}$ associated with a valid tip to "back porch" transition to the minimum and maximum detectors 42, 44 and to the comparators 48 and 58. When the "level" portion detection by detector 26 is completed (Step 316), the statemachine proceeds to Step 318. During Step 318, the statemachine 30 determines whether there has been a positive transition and whether the positive transition is valid (i.e., a valid_transition_detection signal (FIG. 2C) is produced). If there was a valid transition (i.e., a valid_transition_detection) signal (FIG. 2C) is produced, the statemachine is at the "back porch" (Step 320) and the statemachine 30 produces the sync_shape_detected signal (FIG. 10B) at the time of the "back porch" of the video signal. It this sequence (i.e., first "level" portion; negative transition; second "level" portion; positive transition; third "level" portion) is not fully detected, the sync_shape_detected signal (FIG. 10B) is not produced.

Referring again to FIG. 3, the evaluator 24, as noted above, examines and qualifies the information about detected Hsync or Hsync shapes. It employs two separate algorithms, namely the voltage window algorithm (i.e., the voltage window 34) and the time window algorithm (i.e., the time window 34) as well as the monitor circuit 38.

More particularly, the evaluator 24 examines and qualifies the information about the HSync type detected shapes. This is necessary since the parameters in the shape detector 22 are usually adjusted in such a way that it will flag (i.e., produce a sync_shape_detected signal) even if they occur during the active video information 25 (FIG. 1) of the video signal 19. That is, the aim is never to miss any HSync shapes even if they occur during the active video information 25.

Referring to FIG. 10A, an example of a video signal 19 waveform is shown which includes the correct HSyncs just before time points A, C, E, and G. Within the active video information 25 there are HSync type shapes occurring just before time points B, D, and H. The sync_shape_detected signals are shown in FIG. 10B. As shown in FIG. 10B, the shape detector 22 identifies all HSync shapes as soon as they are identified at time points A, B, C, D, E, G, and H. The evaluator 24 receives all those signals and now has the task of separating the valid detected HSync shapes at time points A, C, E, and G from the invalid detected HSyncs shapes at time points B, D, and H, as indicated by the valid_time_win signal in FIG. 10D. In order to make such separation between valid and invalid detected HSync shapes, the following information is determined and used by the evaluator 24: (1) The timing of the detected HSync shapes since valid HSyncs will appear regularly once per video line, or segment, whereas invalid HSync shapes within the active video 25 are picture dependant and may suddenly disappear due to a change in the picture displayed. (This is determined by the time window 34); and, (2) The relative voltage value of the detected HSync tips since the correct HSync shapes will always appear at the lowest relative voltage value within the last video line, or segment. (This is determined by the voltage window 36 which checks the relative DC level (here, average value) of a suspected HSync tip and compares it with the lowest DC level value encountered within the last video line, or segment, to confirm validity).

Figure 7:
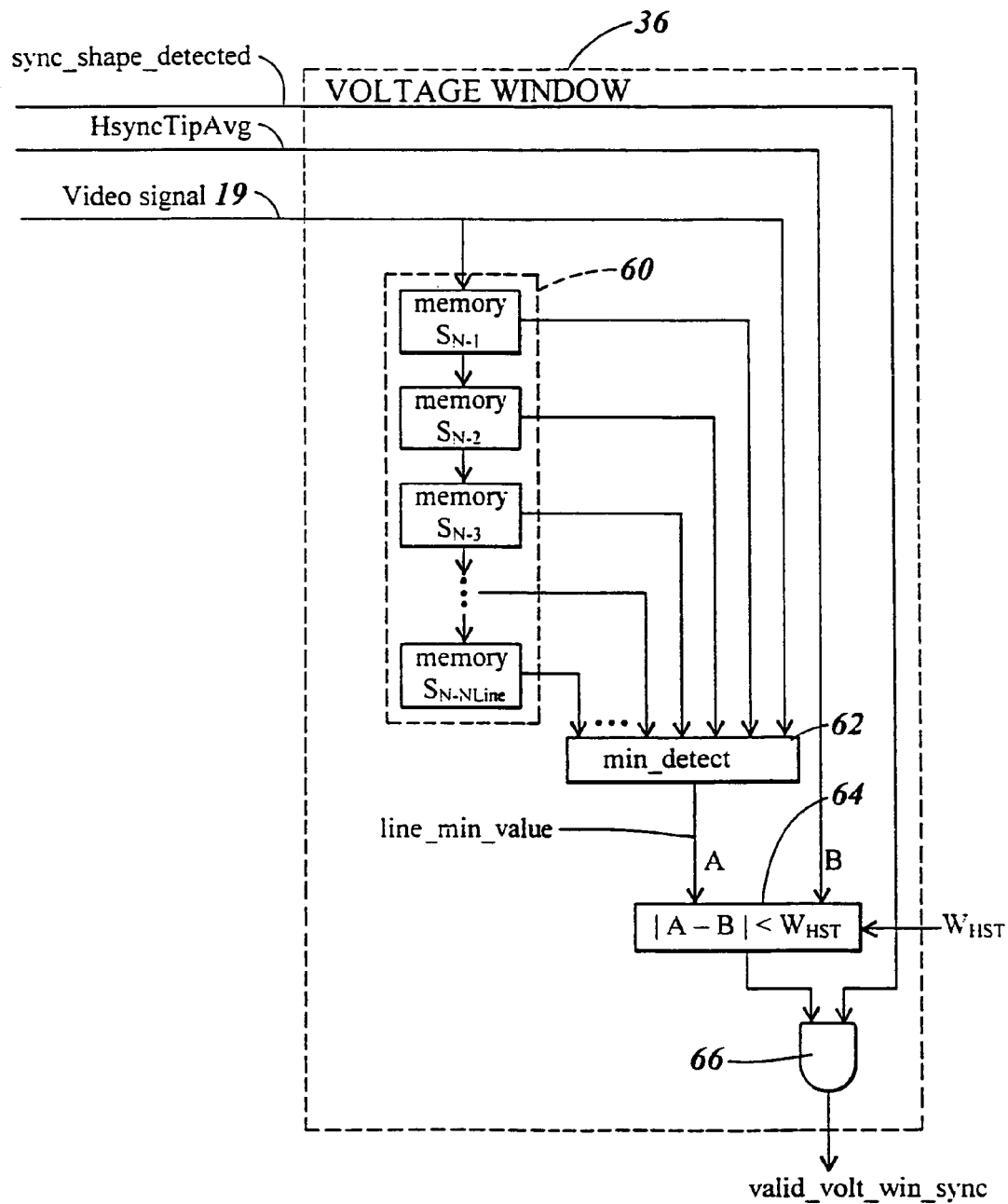
FIG. 7 is a block diagram of a voltage window used in the HSync detector of FIG. 2.

Referring first to the voltage window 36, such voltage window is shown in more detail in FIG. 7. The voltage window 36 takes advantage of the fact that a valid detected HSync will always appear at the lowest voltage detected within the last time-equivalent of a line, or segment, of video. Shapes during the active video 25 (FIG. 1) can be eliminated due to the fact that their offset value is at the "blanking level", hence considerable higher than the valid HSync. It should be noted that a video signal need not be clamped properly for the voltage window 36 to operate properly since the voltage levels are measured in a relative, and not absolute manner. Furthermore, it is worth noting that no synchronization information as such is needed to determine the lowest voltage level detected within the last time-equivalent of a line, or segment, of video.

Referring now to FIGS. 11A–11C, a video signal 19 FIG. 11A) is shown which has a discontinuity (i.e., a DC shift) at time point F as well as invalidly detected HSync-tip shapes at time points B, D, and H. A DC shift usually occurs when genlocked video sources are switched, at the end of a head-switch period from a video cassette recorder, or by switching of other devices within an electrical arrangement. As noted above, the shape detector 22 (FIG. 3) correctly identifies all HSync shapes within the video signal at time points A, B, C, D, E, G, and H, as shown in FIG. 11B.

Applying the criteria that a valid detected HSync tip has the lowest DC voltage level within the previously encountered time-equivalent of a line, or segment, of video, it can been seen that from the detected HSync shapes at time points A and B, the valid HSync shape at time point A can be identified. This is also the case at time points B and C, C and D, D and E, etc. It is noted, however, the time window 36 cannot cope with the DC shift at time point F where the HSync shape at time point G cannot be identified.

From the foregoing, it is noted that the voltage window 36 is readily able to identify valid detected HSync shapes within one single line, or segment, of video (i.e., has a relatively fast lock capability) unless there is a DC shift. Hence, the voltage window 36 is used primarily for initial lock. Thus, valid_volt_win_sync signals are produced at time points A, C, and E as shown in FIG. 11C.

Referring again to FIG. 7, the voltage window 35 includes a shift register type memory section 60 adapted to store samples of the video signal 19 over a time duration which extends for the time duration of an entire video line. That is, the shift register type memory section 60 has $N_{LINE}$ stages to provide samples from the time-equivalent of a line of video (i.e., the memory section stores $N_{LINE}$ samples where $N_{LINE}$ is the number of samples over a time duration of an entire line of video. For example, for PAL, which has a time duration 64 microseconds with a clk pulse rate of 27 MHz, the memory section 60 stores the latest 1728 samples of the video signal 19). These 1728 samples are fed to a minimum value detector 62 which thereby produces a line_min_value signal indicating the lowest value of the last 1728 samples. That is, the line_min_value signal represents the lowest value encountered within the time-equivalent of the last line of video. The line_min_value signal (A) is subtracted from the HSyncTipAvg signal (B) provided by the shape detector 22. As described above, the HSyncTipAvg signal indicates the average value of the second "level" portion, i.e., the tip, of the last detected HSync. A comparator section 64 provides the absolute value of the difference between the line_min_value signal (A) and the HSyncTipAvg signal (B) signal. If this absolute value is less than a predetermined window value $W_{HST}$, and if there is a sync_shape_detected signal, a valid_volt_win_sync signal is produced by AND gate from the voltage window 36. Thus, a valid_volt_win_sync signal is produced when a sync_shape_detected pulse is produced if the HSyncTipAvg signal is within $W_{HST}$ of, than the lowest sample over the last 1728 samples. To put it another way, if the current line_min_value signal is X and the tip value of the detected HSync shape is Y, a valid_volt_win_sync signal is produced if the absolute magnitude of X minus Y is less than $W_{HST}$.

The voltage window 36 is mainly used to acquire initial lock to an unknown and not yet clamped video signal. It only accepts Hsync information if the detected Hsync tip resides at the lowest relative value within a line, or segment, of video. It employs a minimum detector 62 to find the lowest absolute sample value within a line of video and compares the bottom DC value of a Hsync shape with this absolute minimum value. It can therefore reliably distinguish between real Hsync and Hsync-type shapes within active video. It is capable to acquire lock independent of the absolute clamp value of the signal but finds its limitations in the amount of line-to-line DC shifts it can handle.

Figure 8:
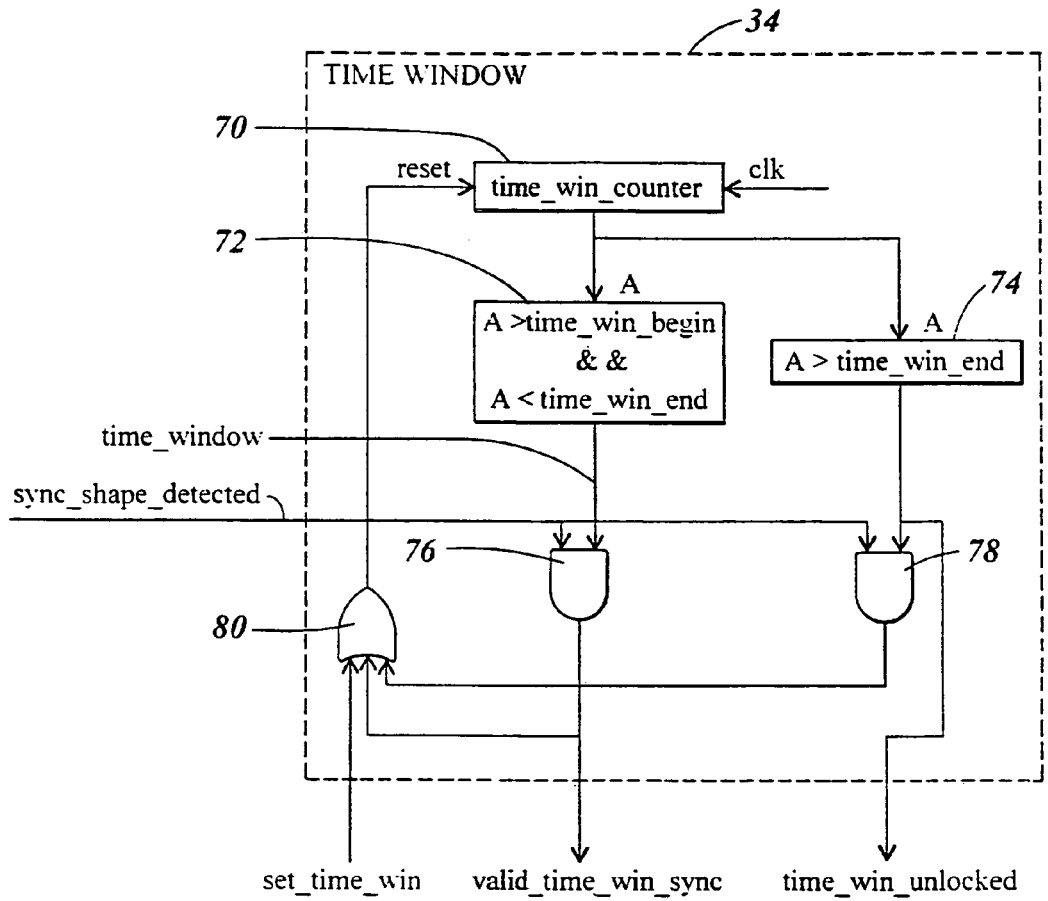
FIG. 8 is a block diagram of a time window used in the HSync detector of FIG. 2.

Referring now to FIG. 8, the time window 34 is shown. The time window 34 will only accept Hsync-type shapes if they happen at regular intervals of the time-equivalent of one line of video. More particularly, referring again to FIGS. 10A, 10B and 10C, there are detected HSync shapes at regular intervals (i.e., at time points A, C, E, and G), the invalid detected HSync shapes most likely disappeared suddenly due to the fact that the content of the active video information region 25 (FIG. 1) changes. This is reflected by the fact that there are detected HSync shapes at video line (i.e., segment) time-equivalent apart at time points B and D, but there are no detected HSync shapes at time point F.

If locked once to the correct detected HSync, (e.g., at time point A), then the time window 34 will generate a time_window signal (FIG. 10C) which is then used as a gating signal to ignore the invalid detected HSync shapes at time points B and D. Because it only uses a time window but no DC voltage levels, it is completely unaffected by the DC shift at time point F in FIG. 10A. This makes the time window 34 very robust once locked.

The time_window signal (FIG. 10C) can only be produced by detecting an HSync shape initially and following up whether this shape re-occurs in regular intervals. This makes the time window a "trial and error" operation when confronted with the problem of initial lock.

In summary, it can be seen that the time window 34 is not effected by DC shifts, but will work reliably if locked to a valid detected HSync. Hence, the time window 34 is preferably used during standard video processing, i.e., at a time after initial lock-in where there is a continuous video signal presented.

Because of the poor performance when acquiring initial lock, some means of setting the time window initially from outside the time window 34 is advantageous. This is achieved by using a set_time_win signal, shown in FIG. 12E. Here, as will be described, the set_time_win signal is produced by the monitor circuit 38 (FIG. 3).

Referring now to FIG. 8, includes a free running counter 70 fed by the clock pulses clk to thereby count clock cycles. The output of counter 70 is fed to a window generator 72 which compares the current count in counter 70 to two parameters establishing the beginning and end of a window in time where the next HSync is expected. The beginning parameter is time_win_begin and the end parameter is time_win_end. An AND gate 76 uses the gating signal time_window (which goes "high", or logic 1 during the interval when the count, here designated A, in counter 70 is between time_win_begin and time_win_end) to block any intermediate sync_shape_detected signals produced by the shape detector 22 (FIG. 3). Thus, only detected HSync shapes which occur during the expected time window (i.e., when the time_window signal is "high") will hence get flagged to the monitor circuit 38 (FIG. 3) via the valid_time_win_sync signal (FIGS. 10C, 12D).

The presence of an expected valid_time_win signal is then also passed through OR gate 80 (FIG. 8) and is used to reset the time_win_counter 70. This effectively resets the time window and allows for checking for detected HSync shapes after the time-equivalent of the next line (i.e., segment) of video.

If no sync_shape_detected signal is produced within the expected time window, as indicated by the time window signal (FIG. 8), then the time_win_counter 70 will exceed the parameter time_win_end. A comparator 74 (FIG. 8) detects this condition. The comparator 74 serves two purposes: It is fed to the monitor circuit 38 (FIG. 3) to indicate that a time_window passed by without the expected HSync shape being detected as a time_win_unlocked signal; and the same time_win_unlocked signal, through AND gate 78, is used to reset the time_win_counter 70 as soon as the next sync_shape_detected signal arrives. This represents the "trial and error" lock-in method described above. The sync_shape_detected signal used now may be the correct one unless proven to be non-repetitive. Proving this may take the time-equivalent of several lines of video. Due to the long lock-in time of the time window 34, it is advisable to add the signal set_time_win. Using this signal, the time window can be started externally. As will be described, here the monitor circuit 38 (FIG. 3) uses the information from the voltage window 36 to set the time window.

Figure 9:
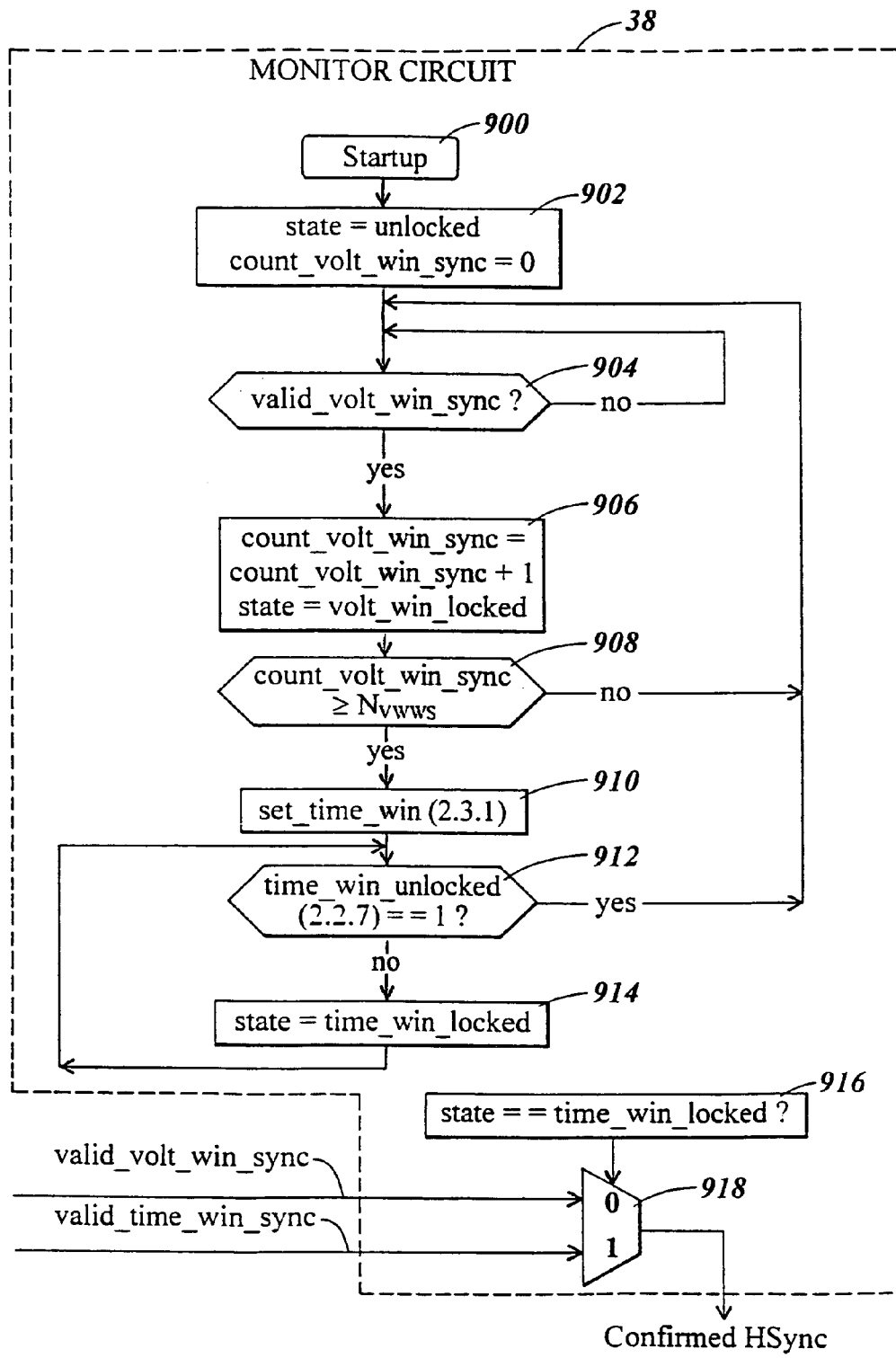
FIG. 9 is a flowchart used by a monitor circuit used in the HSync detector of FIG. 2.

Referring now to FIG. 9, a flowchart is shown which represents the control function performed by the monitor circuit 38. The monitor circuit 38 has access to the results of both the voltage window 36 and the time window 34 at the same time in the form of the signals valid_volt_win_sync (from the voltage window 36) and valid_time_win_sync (from the time window 34). It can also use the flag time_win_unlocked (from the time window 34) to check whether detected HSync-type shapes meet the time window 34 criteria described above.

The monitor circuit 38 uses a variable called "state" which can only have one of three values, namely "unlocked", "volt_win_locked" or "time_win_locked." The comparator 916 (FIG. 9) always and at any time has access to the variable "state" and permanently checks its actual value, comparing it against the value "time_win_locked". If the comparison is true (e.g. the variable state holds the value "time_win_locked") then the comparator 916 responds by outputting a logic 1 which is then used to control the multiplexor 918 in such a way that the overall output from the system "Confirmed_HSync" is equal to the valid_time_win_sync signal. If the variable "state" holds a value different to the value "time_win_locked" ("unlocked" or "volt_win_locked") then the comparator 916 will output a logic 0 and the multiplexor 918 will send the signal valid_volt_win_sync to the output "Confirmed_HSync".

The flowchart in FIG. 9 illustrates which information is used to determine the actual value of the variable "state". Thus, considering the example shown in FIGS. 12A–12G, start-up is at Step 900. Immediately after startup, the variable "state" is assigned the value "unlocked" (Step 902). Concurrently, the comparator 916 compares the actual value of "state" and responds with a logic 0. The multiplexor 918 hence outputs valid_volt_win_sync to Confirmed_HSync. A counter, not shown, in the monitor circuit 38, referred to herein as counter "count_volt_win_sync", not shown, is reset to zero (Step 902).

The monitor circuit 38 then awaits the arrival of the first valid_volt_win_sync signal (Step 904).

As soon as a first valid_volt_win_sync has been detected, the variable "state" is set to the new value "volt_win_locked" (Step 906) and the counter "count_volt_win_sync" is incremented (Step 906). After the counter "count_volt_win_sync", not shown, has encountered several ($N_{VWS}$) valid_volt_win_sync pulses, the time window 34 (which may up to this point have not acquired lock yet) is set to the shape_detected pulses identified by the voltage window 36. This is done by means of he set_time_win signal in Step 910. Sending a short pulse on the set_time_win signal will cause the time_window counter 70 (FIG. 8) to reset and hence the time_window signal will be set to the same HSync pulses as identified by the voltage window 36. FIG. 12E shows this at time point D. Since the set_time_win signal in Step 910 has reset counter 70 (FIG. 8), the time_win_unlocked signal (as produced by time window 34 via comparator 74, FIG. 8) will be set to logic 0 in decision Step 912 (FIG. 9). This will cause the variable "state" to be set to the new value "time_win_locked" during Step 914. The comparator 916 then switches the multiplexor 918 so that the valid_time_win_sync signals are used to produce the output signal Confirmed_HSync. The monitor circuit 38 then enters a loop through Steps 912 and 914. This is the preferred state of the system during normal operation since the correct HSyncs are being identified by the time window 34 and the system is insensitive to DC shifts. The loop continues until the time window 34 fails due to a missing HSync shape at the expected point in time. Such a failure is signaled by the time_win_unlocked signal at decision Step 912 to change to logic high in which case the monitor block reverts back to Step 904.

FIGS. 12A–12G provide an example which will be used to demonstrate the function of the monitor circuit 38. Video signal 19 shows real (i.e., valid) HSync Pulses at time points A, C, E and G but also contains false (i.e., invalid) HSync-type shapes at time points B, D and G as wed as a DC shift at time point F.

As described previously, the shape detector 22 identifies all HSync-type shapes and flags them as shown in FIG. 12B. The voltage window 34 (FIG. 3) qualifies the sync_shape_detected signal (FIG. 12B) and flags the detected shapes at time positions A, C and E in FIG. 12C. It misses the detected shape at time point G due to the DC shift at time point F.

In the example it should be noted that the time window 34 is shown to have started using a false (i.e., invalid) HSync shape at time point B and hence it shows a HSync incorrectly at time point D. This is only the worst case start-up assumption and need not necessarily be the case during every start-up.

After start-up (Step 900) the variable "state" is shown to hold the value of "unlocked" FIG. 12G prior to time point A. The counter "count_volt_win_sync", not shown, is reset to a value of 0. The monitor circuit 38 awaits the occurrence of the first valid_volt_win_sync signal FIG. 12C at Step 904. A first shape is detected by the shape detector 22 at time point A (FIG. 12B). The voltage window 36 identifies this shape as a valid HSync (start-up assumption) FIG. 12C. The multiplexor 918 feeds the valid_volt_win_sync signal through to the output Confirmed_HSync (FIG. 12G, all at time point A). The variable "state" is loaded with the new value "volt_win_locked" at Step 906 (Compare with FIG. 12F at time point A). The counter "count_volt_win_sync", not shown, is incremented, Step 906. Since this is only the first HSync being identified, confidence is still low and the monitor circuit 38 passes through decision Step 908 back to enter Step 904 again.

A sync-type shape is identified by the shape detector 22 at time point B (FIG. 12B). The voltage window 36 disqualifies this shape as not being of lowest DC level within the first time-equivalent of a line of video.

A valid HSync is flagged by the voltage window 36 at point C (FIG. 12C). The multiplexor 918 copies the flag valid_volt_win_sync to Confirmed_HSync (FIG. 12G). The counter count_volt_win_sync, not shown, is incremented (Step 906). Confidence still is not high enough and the monitor circuit 38 passes through decision Step 908 back to enter Step 904 again.

A sync-type shape is identified by the shape detector 22 at time point D (FIG. 12B) but disqualified by the voltage window 36. The voltage window 36 identifies the third correct (i.e., valid) HSync at point E (FIG. 12C). The multiplexor 918 copies the flag valid_volt_win_sync to Confirmed_HSync (FIG. 12G). The counter count_volt_win_sync, not shown, is incremented (Step 906). Confidence now is high enough and the monitor circuit 38 passes through decision Step 908 to Step 910. The set_time_window signal is asserted (FIG. 12E) which slaves the time window 34 to the HSync identified by the voltage window 36 at time point E. The valid_volt_win_sync signal is passed through the multiplexor 918 to the output Confirmed_HSync FIG. 12G. The monitor circuit 38 passes through decision Step 912 and Step 912 and Step 914 where variable "state" gets assigned the new value "time_win_locked" (FIG. 12F). This changes the multiplexer 918 over to output valid_time_win_sync signals to the output Confirmed_HSync.

The next identified shape occurs at time point G (FIG. 12B). Although missed by the voltage window 36 (FIG. 12C) the time window 34 correctly picks it up (FIG. 12D) and it gets passed through to the output Confirmed_HSync (FIG. 12G).

The time window 34 disqualifies the false (i.e., invalid) sync-type shape at time point H (FIGS. 12D, 12D) since it is locked onto the correct HSync pulse sequence.

Other embodiments are within the spirit and scope of the appended claims. For example, while the detection of video synchronization pulses has been describe in detail above, the invention may be used to detect other types of synchronization pulses.

What is claimed is:

1. A synchronization pulse detector, comprising:
    a shape detector for processing samples of an input signal having a synchronization pulse and a plurality of non-synchronization pulses to determine whether such samples have a predetermined sequence;
    said predetermined sequence being a first, non-time varying portion, followed by a first, time-varying portion, followed by a second, non-time varying portion, followed by a second, time-varying portion, followed by a third, non-time varying portion, one of the first and second, time-varying portions having a positive slope and the other one of the first and second, time-varying portions having a negative slope;
    wherein the slope of the time varying portions are determined by comparing said input signal to a specified criterion based in part of the various slope requirements for the time varying portions
    a time window for determining whether said samples are produced at a predetermined rate expected for the series of synchronization pulses; and
    a voltage window for determining whether an average value of one of said second time-varying portions is substantially lower or the same as, but not higher than a lowest DC value detected within the time-equivalent of a segment of video.

2. The detector as claimed in claim 1, wherein said shape detector produces a pulse when said predetermined sequence is detected.

3. A synchronization pulse detector, comprising:
    a shape detector for processing samples of an input signal having a series of synchronization pulses and a plurality of non-synchronization pulses to determine whether such samples have a predetermined sequence;
    said predetermined sequence being a first, non-time varying portion, followed by a first, time-varying portion, followed by a second, non-time varying portion, followed by a second, time-varying portion, followed by a third, non-time varying portion, one of the first and second, time-varying portions having a positive slope and the other one of the first and second, time-varying portions having a negative slope, wherein the slope of the time varying portions are determined by comparing said input signal to a specified criterion based in part of the various slope requirements for the time varying portions;
    said shape detector producing a shape detection pulse each time said predetermined sequence is detected;
    a time window for determining whether said shape detection pulse is produced at a predetermined rate expected for the series of synchronization pulses; and
    a voltage window for determining whether an average value of one of said second time-varying portions is substantially lower or the same as, but not higher than a lowest DC value detected within the time-equivalent of a segment of video; and
    an evaluator responsive to the produced shape pulse detection pulses for determining whether such shape detection pulses are produced at the predetermined rate expected for the series of synchronization pulses.

4. A synchronization pulse detector, comprising:
    a shape detector for processing samples of an input signal having a series of synchronization pulses and a plurality of non-synchronization pulses, each one of said synchronization pulses preceding a segment of the input signal having non-synchronization pulses, to determine whether such samples have a predetermined sequence;
    said predetermined sequence being a first, non-time varying portion, followed by a first, time-varying portion, followed by a second, non-time varying portion, followed by a second, time-varying portion, followed by a third, non-time varying portion, one of the first and second, time-varying portions having a positive slope and the other one of the first and second, time-varying portions having a negative slope, wherein the slope of the time varying portions are determined by comparing said input signal to a specified criterion based in part of the various slope requirements for the time varying portions;
    said shape detector producing a shape detection pulse and an associated value for the second, non-time varying portion each time said predetermined sequence is detected;
    a time window for determining whether said shape detection pulse is produced at a predetermined rate expected for the series of synchronization pulses; and
    a voltage window for determining whether an average value of one of said second time-varying portions is substantially lower or the same as, but not higher than a lowest DC value detected within the time-equivalent of a segment of video; and
    an evaluator responsive to the produced shape detection pulses and said associated values of said second, non-time varying portions for determining whether one of said associated values of said produced second, non-time varying portions is substantially higher, lower, or the same as a reference value derived from a previous segment of the input signal.

5. A method for detection of a synchronization pulse from an input signal having a plurality of non-synchronization pulses, comprising:
    determining time-varying slopes of an input signal having the synchronization pulse;
    comparing the determined time-varying slopes with time-varying slopes expected of the synchronization pulse;
    producing, based on the comparison, an output signal indicative of the detection of the synchronization pulse;
    determining whether said output signal is produced at a predetermined rate expected for the series of synchronization pulses; and
    determining whether an average value of one of said time-varying portions is substantially lower or the same as, but not higher than a lowest DC value detected within the time-equivalent of a segment of video.

6. A method for detection of a synchronization pulse having a substantially non-time varying portion and a substantially time-varying portion, the method comprising:
    determining time varying slopes of one of the portions;
    comparing the determined time-varying slopes with time-varying slopes expected of the one of the portions of the synchronization pulse;
    producing, based on the comparison, an output signal indicative of the detection of the synchronization pulse;
    determining whether said output signal is produced at a predetermined rate expected for the series of synchronization pulses; and
    determining whether an average value of one of said time-varying portions is substantially lower or the same as, but not higher than a lowest DC value detected within the time-equivalent of a segment of video.

7. A method for detection of a synchronization pulse within an input signal, such pulse having a substantially non-time varying portion and a substantially time-varying portion, the method comprising:
- determining time-varying slopes of the input signal to identify one of the portions;
- comparing the determined time-varying slopes with time-varying slopes expected of the one identified one of the portions of the synchronization pulse; and
- producing, based on the comparison, an output signal indicative of the detection of the synchronization pulse;
- determining whether said output signal is produced at a predetermined rate expected for the series of synchronization pulses; and
- determining whether an average value of one of said time-varying portions is substantially lower or the same as, but not higher than a lowest DC value detected within the time-equivalent of a segment of video.

8. A method for detection of a synchronization pulse within each of a sequence of input signals having a predetermined rate, such pulse having a substantially non-time varying portion and a substantially time-varying portion, the method comprising:
- determining time-varying slopes of each of the sequence of input signals to identify one of the portions of such one of the input signals;
- comparing the determined time-varying slopes with time-varying slopes expected of the one identified one of the portions of the synchronization pulse;
- producing, based on the comparison, output signals indicative of the detection of the synchronization pulses of the sequence of input signals; and
- comparing rate of production of the output pulses with the predetermined rate of the input signals;
- determining whether said output pulses are produced at a predetermined rate expected for the series of synchronization pulses; and
- determining whether an average value of one of said time-varying portions is substantially lower or the same as, but not higher than a lowest DC value detected within the time-equivalent of a segment of video.

9. A system for detecting a synchronization pulse within an input signal, such synchronization pulse having a substantially non-time varying portion followed by a substantially time-varying portion, the system comprising:
- a waveform characteristic detector for producing a detection signal in response to a comparison between actual slope variations in the input signal and a predetermined slope criterion representative of one of the portions of the synchronization pulse; and
- a pulse generator for producing an output pulse in response to the detected signal produced by the waveform characteristic generator
- a time window for determining whether said output pulse is produced at a predetermined rate expected for the series of synchronization pulses; and
- a voltage window for determining whether an average value of one of said time-varying portions is substantially lower or the same as, but not higher than a lowest DC value detected within the time-equivalent of a last segment of video.

* * * * *